United States Patent [19]
Tornero et al.

[11] Patent Number: 5,832,852
[45] Date of Patent: Nov. 10, 1998

[54] CUSHION AND METHOD

[75] Inventors: Roger Tornero; S. David Gray, both of Greensboro, N.C.

[73] Assignee: CINCO, Inc., Greensboro, N.C.

[21] Appl. No.: 821,058

[22] Filed: Mar. 20, 1997

[51] Int. Cl.$^6$ .............................. D05B 93/00; B32B 7/08
[52] U.S. Cl. .................... 112/475.08; 112/402; 112/420; 112/429; 112/440; 428/71
[58] Field of Search ............... 428/71; 112/402, 112/420, 429, 440, 475.08

[56] References Cited

U.S. PATENT DOCUMENTS

| | | | |
|---|---|---|---|
| 3,354,020 | 11/1967 | Copeland | 161/53 |
| 3,821,065 | 6/1974 | Copeland et al. | 161/67 |
| 4,369,081 | 1/1983 | Curry et al. | 156/148 |
| 4,606,088 | 8/1986 | Michaelson et al. | 5/434 |
| 5,100,724 | 3/1992 | LaMarca, II et al. | 428/300 |

*Primary Examiner*—Peter O'Sullivan

[57] ABSTRACT

A method of forming cushions by needle punching is demonstrated in which superior structural integrity is achieved without adhesives or other external fasteners. The process is economical and utilizes polyurethane foam which is mechanically bound by needle punching to various polymeric fibers. In an alternate embodiment of the process, the needle punching causes the fibers to penetrate the foam block at an angle to the vertical for greater mechanical bonding between the fiber layer and the foam block. The cushion so formed by the various processes can be covered or upholstered as needed for furniture seating and other purposes.

20 Claims, 8 Drawing Sheets

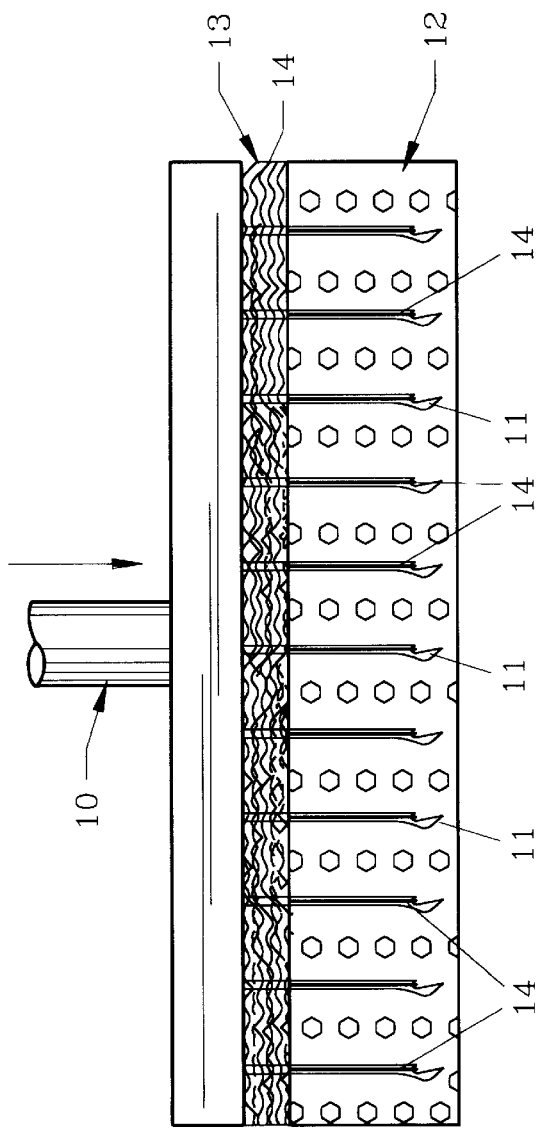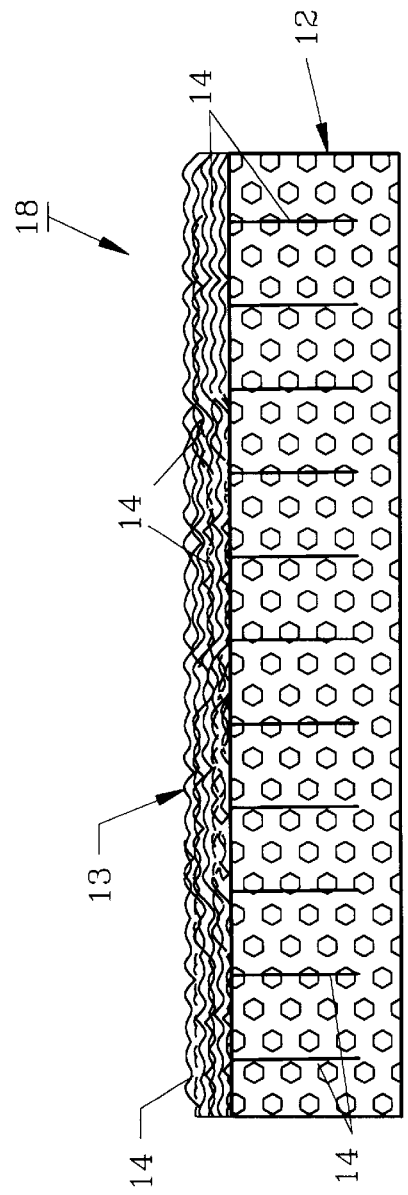

CUSHION AND METHOD

FIELD OF THE INVENTION

The invention herein pertains to a furniture cushion and method of manufacturing and particularly to a furniture cushion having a needle punched fiber layer attached to a foam block.

DESCRIPTION OF THE PRIOR ART AND OBJECTIVES OF THE INVENTION

Polyurethane foam has long been used in the furniture industry to form seating cushions and similar articles. In some instances, needle punching is utilized to attach foam to various substrates. Fibrous batts which contain randomly arranged fibers may be delivered from a garnetting machine or other and are well-known in the cushion and upholstering industry. However, to attach the foam to fibrous batts or layers, adhesives are conventionally used to ensure durability and prevent spot "sagging" in finished cushions and other articles. It is also conventional in the art to spray a fine coating of an adhesive to insure stability once fibers are needle punched to fabric backings or the like.

In recent years the cost of such adhesives has risen due to increase in raw materials, handling and disposal. Workers must be guarded from toxic or irritating resins and fumes as they work, requiring expensive protective clothing and other accessories. In addition, the disposal of waste or excess adhesives must be carried out under various State and Federal laws which again impact the manufacturing economies.

Thus, with the problems and disadvantages associated with conventional fiber-to-foam attaching methods, the present invention was conceived and one of its objectives is to provide a cushion structure and method of manufacturing which is economical, durable and adhesive-free.

It is another objective of the present invention to provide one method of manufacturing a durable furniture cushion in which a fiber layer is needle punched into a foam block in a simple, vertical one-step process.

It is still another objective of the invention to provide a method of manufacturing a furniture cushion in which a fiber layer is angularly needle punched into a foam block for greater structural integrity.

It is yet another objective of the present invention to provide an alternative method of forming a cushion whereby a fiber layer is sandwiched between two foam blocks by needle punching.

Another objective of the invention is to provide cushions formed from the methods described herein which can be further processed such as by adding a fabric cover or upholstery layer.

Various other objectives and advantages of the present invention will become apparent to those skilled in the art as a more detailed description is set forth below.

SUMMARY OF THE INVENTION

The invention herein describes methods of attaching a fiber layer or batt having loose, intermingled fibers to a foam block for the manufacture of cushions. In one embodiment a polyurethane foam block is covered with a fiber layer and needle punching apparatus having straight, vertically aligned needles is utilized to adhere the foam block and fiber layer.

In another embodiment of the method of cushion formation, a needle punching apparatus whereby the needles strike the fiber layer and foam block at an angle for increased adhesion between the foam block and fiber layer, compared to vertical needle punching methods.

In still another embodiment, the method describes the needle punch attachment of a fiber layer between two foam blocks. The cushions formed from the methods herein are suitable for normal handling during subsequent processing such as covering and upholstering the cushions without degradation thereto.

BRIEF DESCRIPTION OF THE DRAWINGS

FIG. 2 shows the subsequent step in the preferred method with needles having collected fibers and driven the fibers into the foam block from the fiber layer with the needles not yet withdrawn;

FIG. 3 demonstrates the product formed from the preferred method as seen in FIGS. 1 and 2.

DESCRIPTION OF THE PREFERRED EMBODIMENTS

Figure 1:
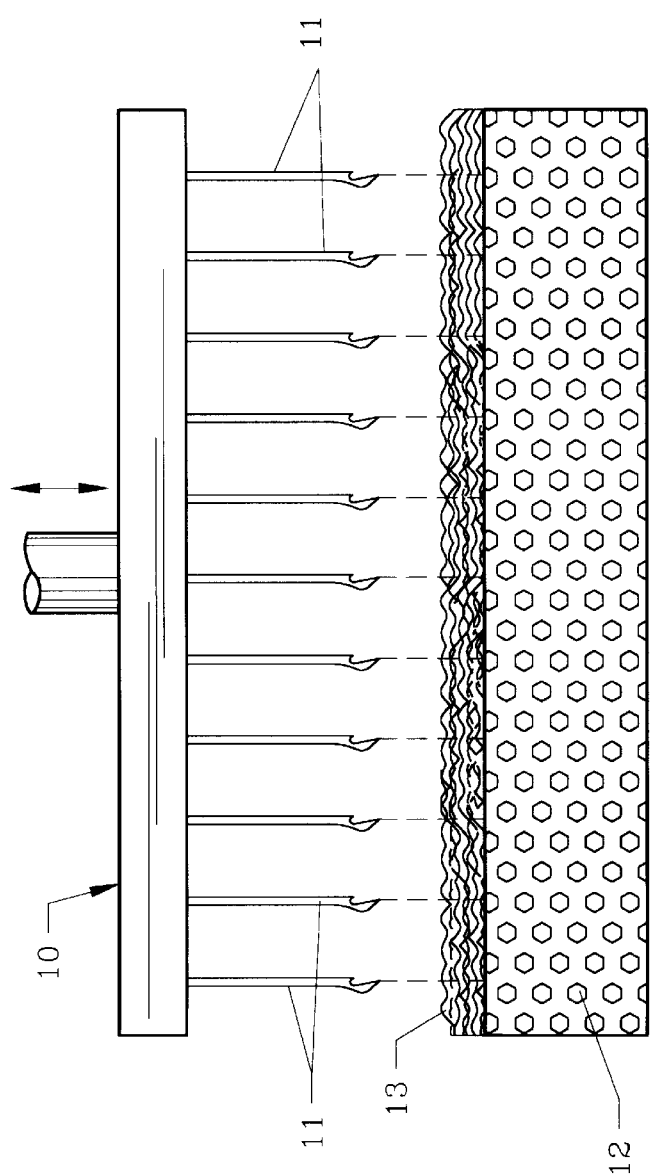
FIG. 1 illustrates the initial phase of the preferred method of the invention with the needle assembly elevated prior to needle punching.

The preferred method of the invention is shown in FIG. 1, 2 and 3 whereby a needle assembly is schematically shown in which, as would be understood, is driven pneumatically or hydraulically or otherwise as is well-known in the art. A typical block of polyurethane foam is cut to desired size, having a thickness of 25 mm or more. Next, a fiber layer is then applied to the top of the polyurethane foam block such as from a garnett machine or other equipment which will deliver a layer of preferably, polyester fibers thereon, each having a length of at least 44 mm. The fibers are tightly, randomly intermingled, but are not adhesively or otherwise joined. Once the fibers are so positioned, the needle assembly then drives through the fiber layer, as shown in FIG. 2, whereby each needle collects one or more polyester fibers from the fiber layer and drives it to a depth of approximately 18 mm within the foam block. Next, the needle assembly is withdrawn from the foam block and the finished, preferred cushion, as shown in FIG. 3, is ready for further processing such as covering with a fabric layer and/or upholstering. It has been found that a cushion so produced maintains its structural integrity during handling, covering and upholstering without the need of adhesives or mechanical fasteners.

DETAILED DESCRIPTION OF THE DRAWINGS AND OPERATION OF THE INVENTION

For a better understanding of the invention and its operation, turning now to the drawings, FIG. 1 schematically shows needle apparatus 10 which may be pneumatically or otherwise operated having a series of needles 11 affixed thereto. Foam block 12, which typically may be a 25–101 mm thick block of polyurethane foam, has a layer of loose fibers 14 in the form of fiber layer 13 seen therein having a density of about 28 grams per square meter (1 ounce per square foot) placed thereon such as garnetted fibers or other processed fibers, whereby said fibers 14 are commingled but without attachment such as by gluing or other adhesion methods. Polyester, polypropylenes or other polymeric and types of fibers can be used. With fiber layer 13 so positioned, needle apparatus 10 as shown in FIG. 2 is punched through fiber layer 13 into foam 12 whereby needles 11 collect and drive one or more individual fibers 14 therewith. Fibers 14 penetrate into foam 12, where, as shown in FIG. 3, fiber layer 13 is then securely bonded to foam 12. Other suitable polyfoams, other than polyurethane, may be used as desired. Cushion 18 which includes fiber layer 13 needle punched to foam block 12 is suitable for covering with an appropriate fabric or upholstering for use as a chair seat, sofa cushion or other purposes. Fibers 14 may be polyester, polypropylene or other suitable fibers and a minimum fiber length of approximately 44 mm is required. In order to form a secure bond between foam block 12 and fiber layer 13, needles 11 must preferably drive fibers 14 approximately 18 mm vertically into foam block 12 for the best results and structural integrity.

Figure 4:
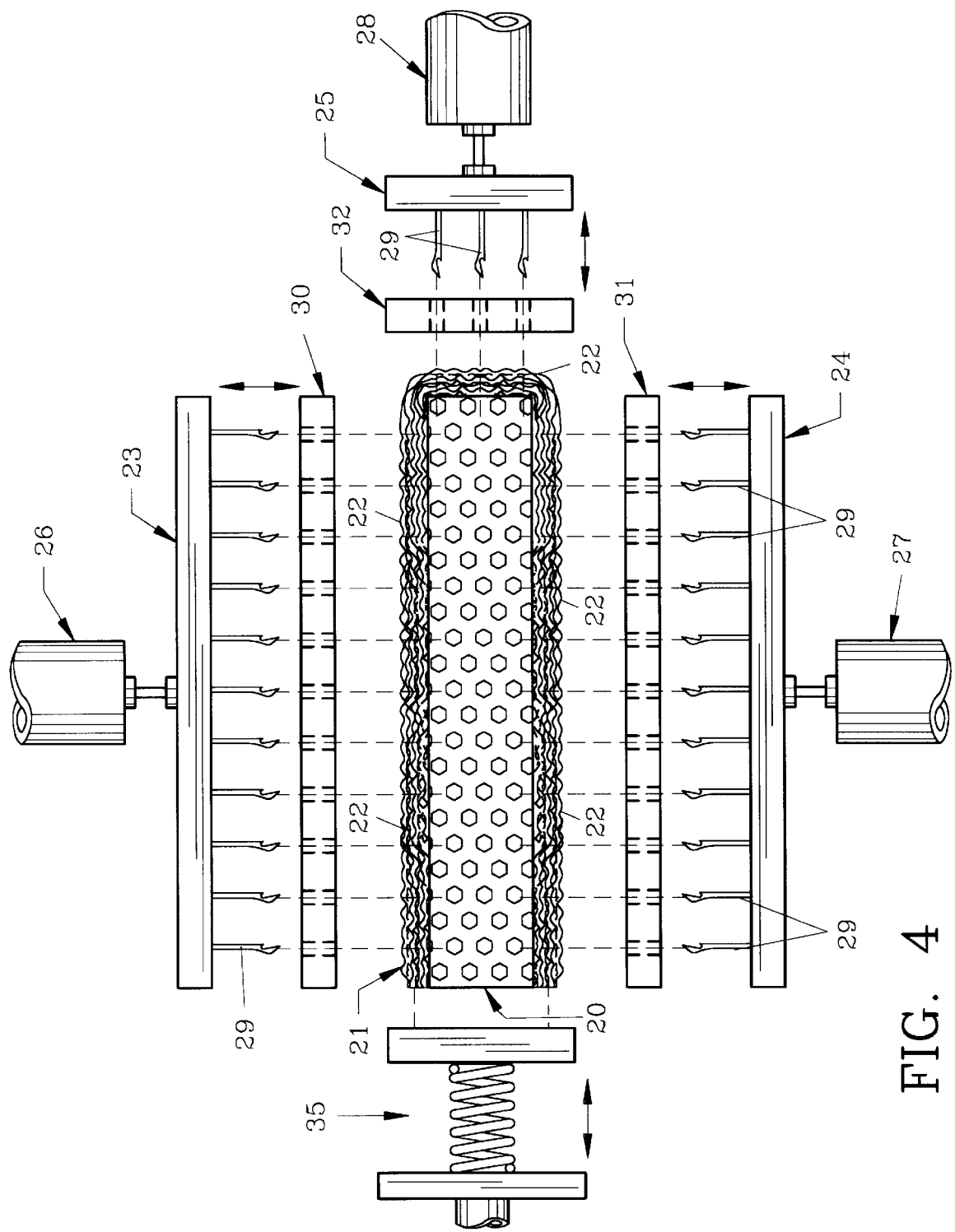
FIG. 4 features a trio of needle assemblies as used in an alternate method of the invention.

In FIG. 4 another embodiment of the invention is schematically seen whereby foam block 20 has fiber layer 21 with individual fibers 22 on the top, bottom and one end thereof. Needle punching occurs along the top of foam block 20 by needle assembly 23, along the bottom by needle assembly 24, and at one end by needle assembly 25. Hydraulic cylinders 26, 27 and 28 respectively drive needle assemblies 23, 24 and 25. Platforms 30, 31 and 32 are adjustable from foam block 20 to limit the depth of needle penetration into foam block 20. By adjusting platforms 30, 31 and 32 from foam block 20, various lengths of needle penetration can be achieved, without changing the length of needles 29. Spring-loaded back plate 35 is likewise adjustable to and from foam block 20 and prevents movement of foam block 20 as needle assembly 25 is operated.

Figure 5:
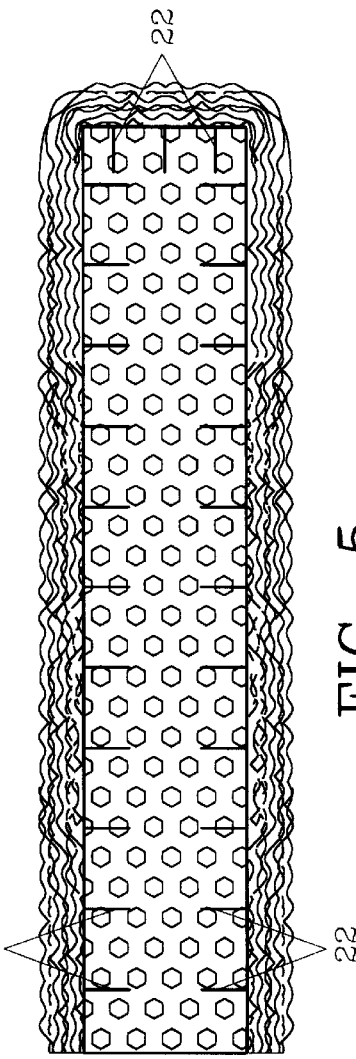
FIG. 5 presents the product formed from the method as carried out as in FIG. 4.

Cushion 40 as shown in FIG. 5 provides a furniture cushion with a fiber layer on three sides which may be used in more expensive, high-end chairs, sofas and other furniture whereas cushion 18 as shown in FIG. 3 may be used in less expensive furniture. Cushion 40 is manufactured as pictured in FIG. 4 with fibers 22 penetrating foam block 20 to maintain the structural integrity thereof.

Figure 6:
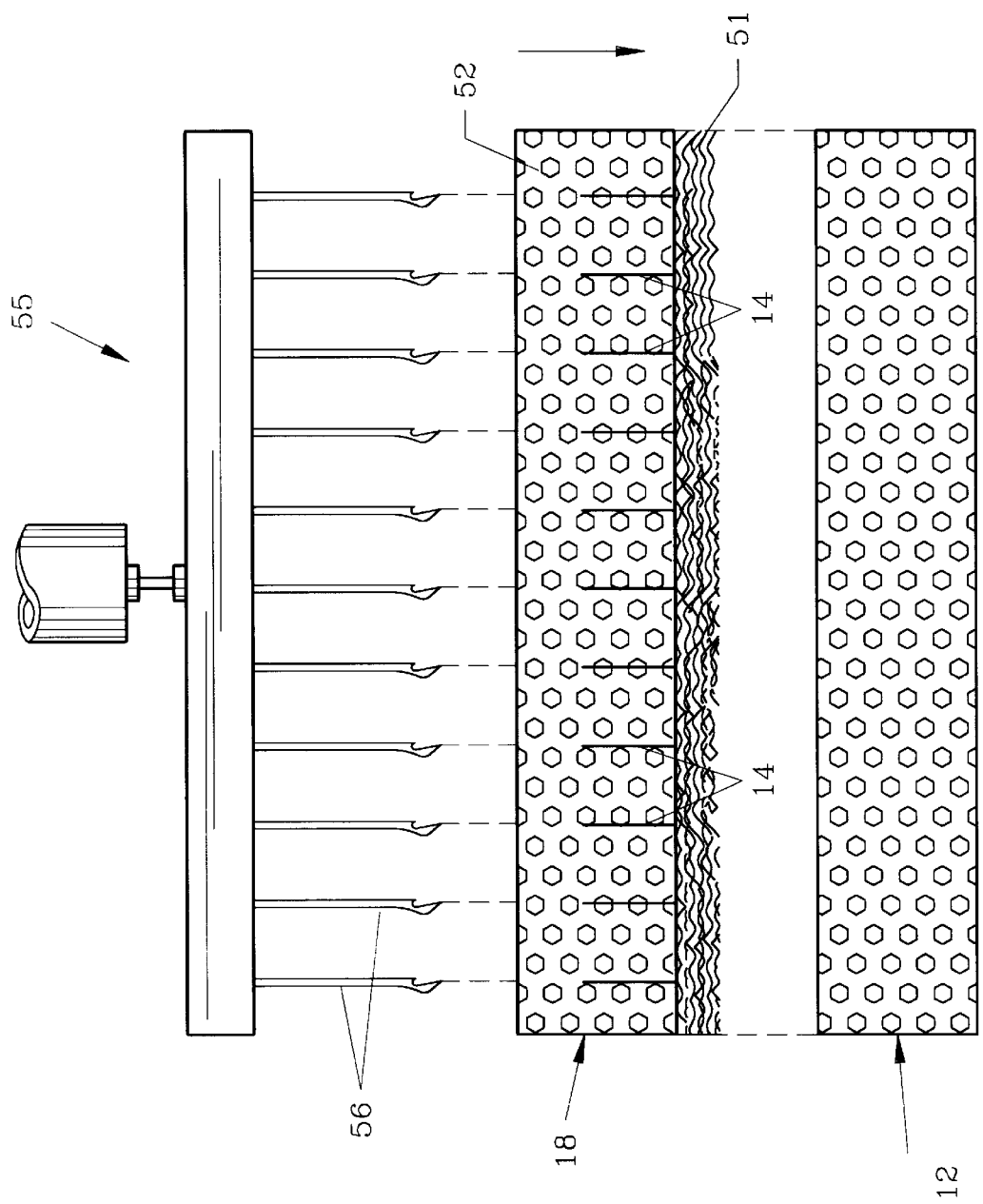
FIG. 6 depicts another alternate method of the initial step of a process utilizing two foam blocks.
Figure 7:
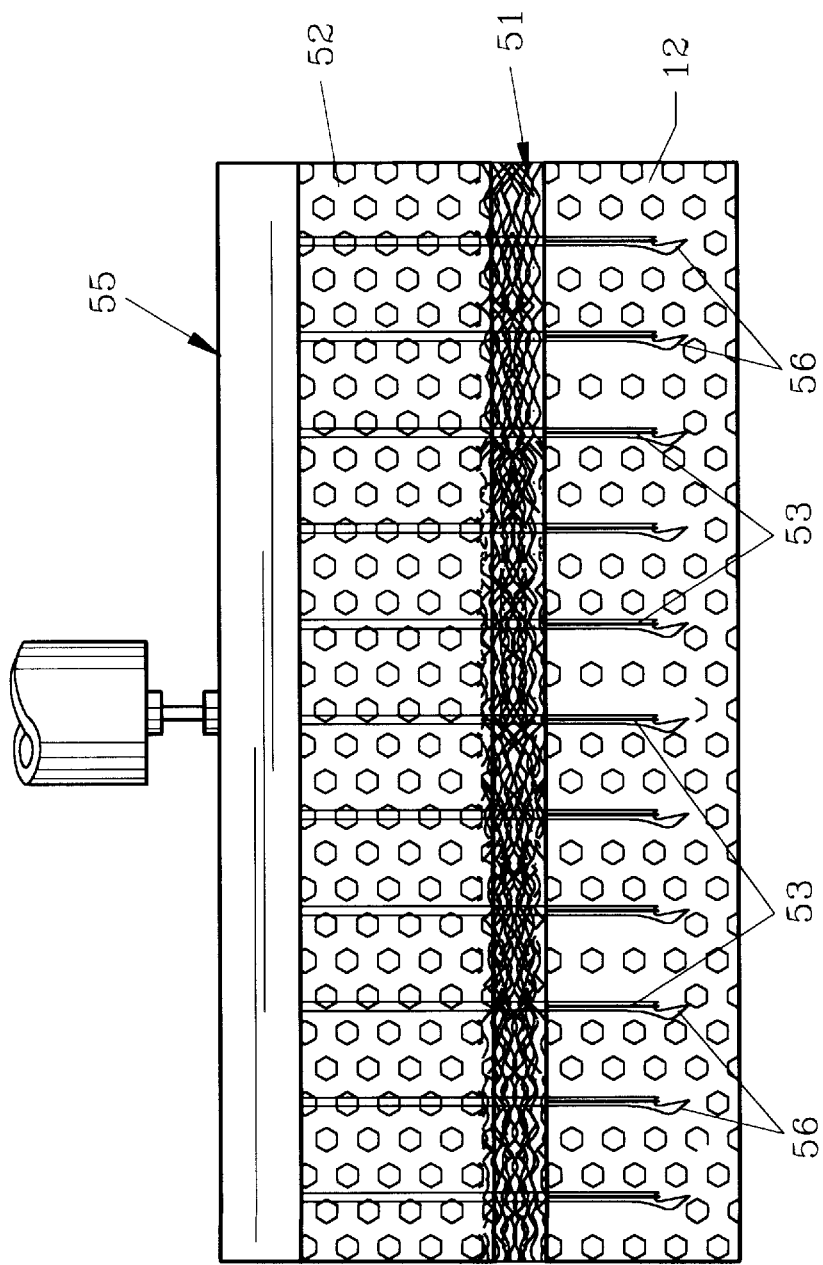
FIG. 7 shows a subsequent step in the method of FIG. 6 with the needle assembly during needle punching.
Figure 8:
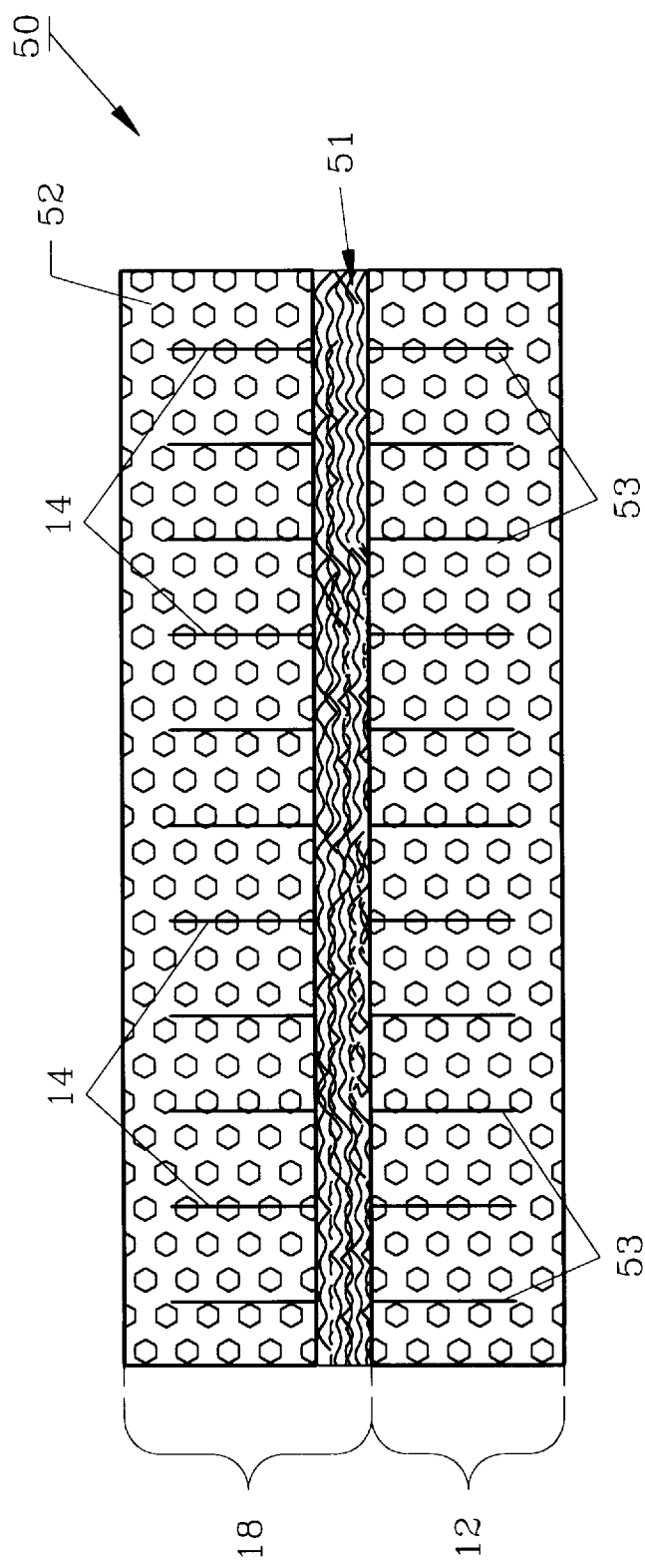
FIG. 8 demonstrates the product formed from the method as seen in FIGS. 6 and 7.

Another embodiment of the invention is shown in FIGS. 6, 7 and 8, whereby cushion 50 is manufactured by sandwiching fiber layer 51 between top foam block 52 and bottom foam block 12. This sandwiching effect is carried out by forming cushion 18 as shown in FIG. 3. Next, cushion 18 is inverted as shown in FIG. 6 and placed atop foam block 12. Next, needle assembly 55 is operated to drive needles 56 through cushion 18 and into foam block 12 therebelow with fibers 53 collected by needles 56 as shown in FIG. 7. Once needle assembly 55 is removed, cushion 50 is formed as shown in FIG. 8. Fibers 14 and fibers 53 provide the necessary strength to maintain cushion 50 in a secure manner for handling during covering, upholstering and other operations. If desired, additional fiber or foam blocks could be adhered by needle punching as described for additional layers.

Figure 9:
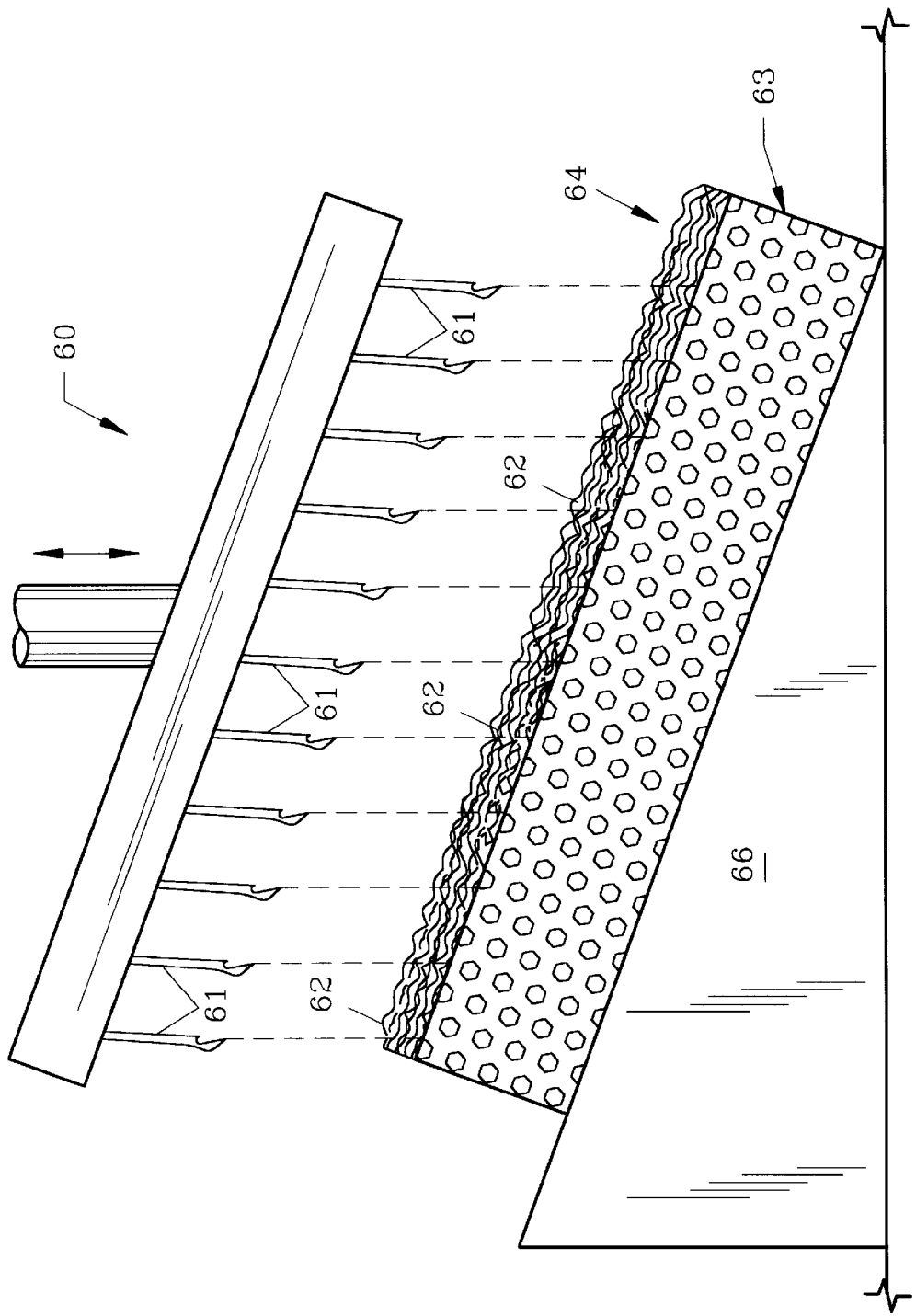
FIG. 9 illustrates another alternate embodiment of the method at the initial step thereof, and FIG. 10 features the product formed from the method of FIG. 7.

Still another embodiment of the method and cushion hereinbefore described is shown in FIG. 9. As seen, needle assembly 60 includes a plurality of needles 61 arranged to angularly penetrate foam block 63 having fiber layer 64 positioned thereon as previously described. In FIG. 9, support 66 which may be a table or the like, is biased at an angle of approximately 20° from the horizontal, as needle assembly 60 drives fibers 62 into foam block 63.

Figure 10:
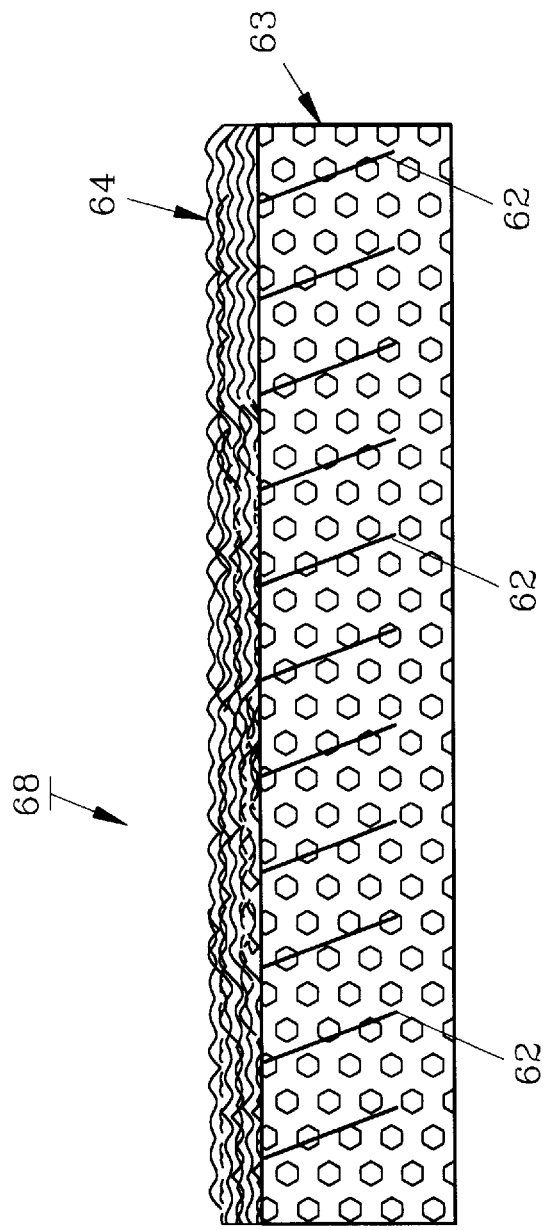

As shown in FIG. 10 fibers 62 which penetrate foam block 63 are angularly disposed approximately 20° from the vertical. This angular positioning of fibers 62 increases the adherence of fiber layer 64 to foam block 63 thus providing greater mechanical bonding between fibrous layer 64 and foam block 63. While fibers 62 (which may represent a plurality of fibers) are shown at an angle of approximately 20° from the vertical, various needle angles may be utilized within practical limits, it being understood that the mechanical adhesion being greater as the angle of fibers 62 from the vertical is increased. Thus, cushion 68 has greater structural integrity than cushion 18 of FIG. 3, with all other factors in the process being the same, except for the angular penetration of the needles.

As also seen in FIG. 10, identical angles are seen for all fibers 62 within foam block 63, however, certain needles of needle assembly 60 may be at different angles from other needles therealong, depending on the adhesion required at different locations along foam block 63.

The illustrations and examples provided herein are for explanatory purposes only and are not intended to limit the scope of the appended claims.

We claim:

1. A method of forming a foam cushion comprising the steps of:
   a) selecting a foam block having a thickness of at least about 25 mm;
   b) placing a layer of loose, intermingled fibers having a length of at least 44 mm on the foam block; and
   c) needle punching the fibers at an angle from the vertical through the foam block to a depth of at least 18 mm to mechanically bond the same.

2. The method of claim 1 wherein needle punching the fibers comprises needle punching the fibers with needles which are spaced about 12 mm to 76 mm apart.

3. The method of claim 1 wherein the step of selecting a foam block comprises selecting a foam block of from 25 mm to 254 mm in thickness.

4. The method of claim 1 wherein placing a layer of loose fibers comprises placing fibers having a length of from about 44 mm to 100 mm.

5. The method of claim 1 further comprising the step of placing the needle punched foam into a fabric cover to form a cushion.

6. The method of claim 5 further comprising the step of upholstering the cushion.

7. A method of mechanically bonding foam layers comprising the steps of:
   a) selecting first and second foam blocks;
   b) covering one side of the first foam block with loose, intermingled fibers;
   c) needle punching the loose fibers into the first foam block;
   d) placing the second foam block against the fiber covered side of the first foam block; and
   e) needle punching through the first foam block, through the fibers and into the second foam block to thereby bond the first foam block to the second foam block.

8. The method of claim 7 wherein selecting first and second foam blocks comprises selecting polyurethane foam blocks.

9. The method of claim 7 wherein covering the first block with loose fibers comprises covering the first block with loose polyester fibers.

10. The method of claim 7 wherein covering the first foam block with loose fibers comprises covering the first block with loose polypropelene fibers.

11. The method of claim 7 wherein needle punching the loose fibers into the first foam block comprises needle punching the loose fibers to a depth of at least 18 mm.

12. The method of claim 7 wherein selecting a first and second foam block comprises selecting rectangular foam blocks of equal size.

13. A method of forming a foam cushion comprising the steps of:
   a) selecting a foam block;
   b) placing a layer of loose intermingled fibers onto the foam block to form a fiber layer thereon;
   c) needle punching the fibers at an angle from the vertical into the foam block to adhere the block and the fibers together.

14. The method of claim 13 wherein needle punching the loose fibers comprises the step of needle punching the loose fibers at an angle of 20° from the vertical.

15. The method of claim 2
   wherein the step of selecting a foam block comprises selecting a rectangular polyurethane foam block of from 25 mm to 254 mm in thickness;
   wherein needle punching the loose fibers at an angle comprises needle punching the loose fibers at an angle of 20° from the vertical;
   wherein the step of placing a layer of loose fibers comprises placing loose polypropelene fibers having a length of from about 44 mm to 100 mm; and
   further comprising the steps of:
      placing the needle punched foam into a fabric cover to form a cushion; and
      upholstering the cushion.

16. The method of claim 2
   wherein the step of selecting a foam block comprises selecting a rectangular polyurethane foam block of from 25 mm to 254 mm in thickness;
   wherein needle punching the loose fibers at an angle comprises needle punching the loose fibers at an angle of 20° from the vertical;
   wherein the step of placing a layer of loose fibers comprises placing loose polyester fibers having a length of from about 44 mm to 100 mm; and
   further comprising the steps of:
      placing the needle punched foam into a fabric cover to form a cushion; and
      upholstering the cushion.

17. The method of claim 8
   wherein covering the first block with loose fibers comprises covering the first block with loose polyester fibers;
   wherein needle punching the loose fibers into the first foam block comprises needle punching the loose fibers to a depth of at least 18 mm; and
   wherein the selecting a first and second foam block comprises selecting rectangular polyurethane foam blocks of equal size.

18. The method of claim 14 further comprising the step of placing the needle punched foam into a fabric cover to form a cushion.

19. The method of claim 13 wherein needle punching the fibers at an angle from the vertical into the foam block comprises needle punching the fibers with a plurality of needles placed at different angles from other needles therealong.

20. The method of claim 19 further comprising the steps of:
   placing the needle punched foam into a fabric cover to form a cushion and
   upholstering the cushion.

* * * * *